(12) United States Patent
Bernardo

(10) Patent No.: US 9,404,451 B2
(45) Date of Patent: Aug. 2, 2016

(54) AUTOMOTIVE AIR CLEANER ELEMENTS WITH ATTACHMENT/INSULATION FEATURE

(71) Applicant: GM Global Technology Operations LLC, Detroit, MI (US)

(72) Inventor: Giovanni F. Bernardo, Sao Paulo (BR)

(73) Assignee: GM Global Technology Operations LLC, Detroit, MI (US)

(*) Notice: Subject to any disclaimer, the term of this patent is extended or adjusted under 35 U.S.C. 154(b) by 98 days.

(21) Appl. No.: 14/251,048

(22) Filed: Apr. 11, 2014

(65) Prior Publication Data

US 2015/0292377 A1 Oct. 15, 2015

(51) Int. Cl.
| F02M 35/02 | (2006.01) |
| F02M 35/024 | (2006.01) |
| F02M 35/10 | (2006.01) |
| F02M 35/12 | (2006.01) |
| B01D 46/42 | (2006.01) |
| B01D 46/00 | (2006.01) |

(52) U.S. Cl.
CPC ..... *F02M 35/02416* (2013.01); *B01D 46/4236* (2013.01); *F02M 35/10295* (2013.01); *F02M 35/1283* (2013.01); *B01D 46/001* (2013.01); *B01D 46/0005* (2013.01); *B01D 2279/60* (2013.01)

(58) Field of Classification Search
CPC ............. B01D 46/008; B01D 46/0005; B01D 46/0043; B01D 46/0023; B01D 46/0028; F02M 35/14; F02M 35/024; F02M 35/0203; F02M 35/10013
USPC ........... 55/385.3, 490, 498, 507; 96/380, 383, 96/386; 180/68.1, 218, 219; 123/198 E, 123/184.56; 454/158
See application file for complete search history.

(56) References Cited

U.S. PATENT DOCUMENTS

| | | | | | |
|---|---|---|---|---|---|
| 2,372,618 | A | * | 3/1945 | Vokes | F02M 35/14 55/477 |
| 5,433,772 | A | * | 7/1995 | Sikora | B03C 3/32 422/120 |
| 6,217,627 | B1 | * | 4/2001 | Vyskocil | B01D 46/0005 123/198 E |
| 6,638,330 | B1 | * | 10/2003 | Bergami | B01D 46/0043 55/315.1 |
| 6,641,636 | B2 | * | 11/2003 | Willig | B01D 46/0002 123/198 E |
| 6,881,237 | B2 | * | 4/2005 | Storz | F02M 35/024 123/198 E |
| 6,908,115 | B2 | * | 6/2005 | Synder | F24F 13/084 285/189 |
| 7,520,258 | B2 | * | 4/2009 | Choi | F02M 35/10013 123/184.56 |
| 7,635,402 | B2 | * | 12/2009 | Hoffman | B01D 46/008 116/266 |
| 8,851,220 | B2 | * | 10/2014 | Abe | B01D 46/0005 180/68.1 |
| 8,991,533 | B2 | * | 3/2015 | Abe | F02M 35/0203 180/218 |
| 2002/0124734 | A1 | * | 9/2002 | Spannbauer | F02M 35/024 96/380 |
| 2005/0050868 | A1 | * | 3/2005 | Bugli | B01D 46/0023 55/482 |
| 2008/0307759 | A1 | * | 12/2008 | Reichter | B01D 46/0005 55/428 |
| 2009/0010801 | A1 | * | 1/2009 | Murphy | B01D 46/0028 422/4 |
| 2011/0023427 | A1 | * | 2/2011 | Srinivasan | F02M 35/024 55/385.3 |

* cited by examiner

*Primary Examiner* — Duane Smith
*Assistant Examiner* — Minh-Chau Pham
(74) *Attorney, Agent, or Firm* — BrooksGroup

(57) ABSTRACT

A number of variations may include an air cleaner assembly which comprises a first housing portion having at least one air inlet aperture. The air cleaner assembly may further include a second housing portion operably coupled to the first housing portion and having at least one air outlet aperture. Moreover, a filter media may be disposed between the first housing portion and the second housing portion. At least one insulator may be integrally formed with the filter media. The entire filter media including the insulator may be removable and replaceable.

32 Claims, 4 Drawing Sheets

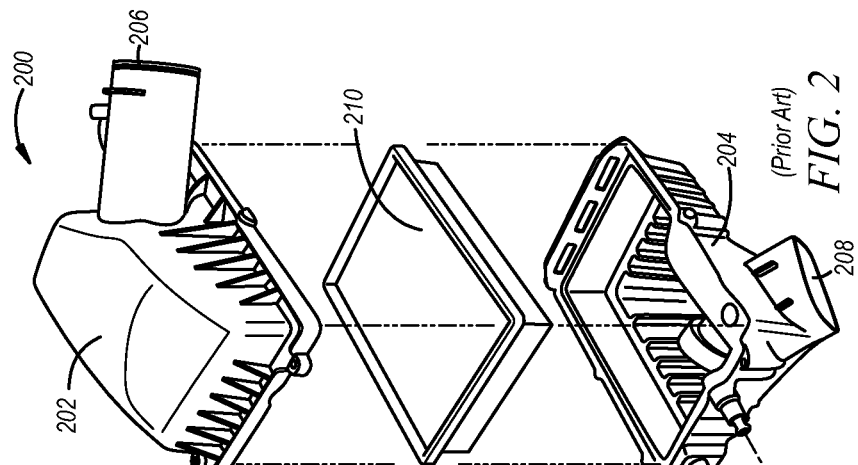
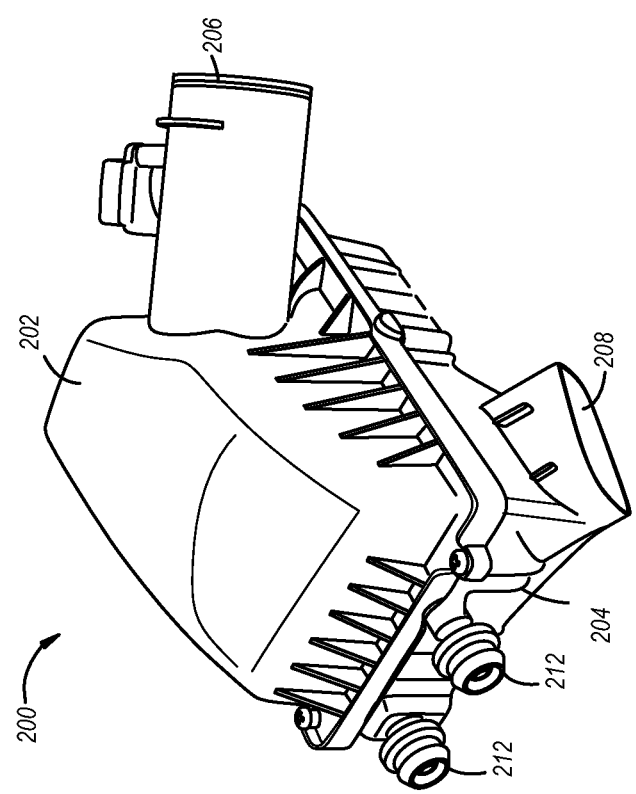

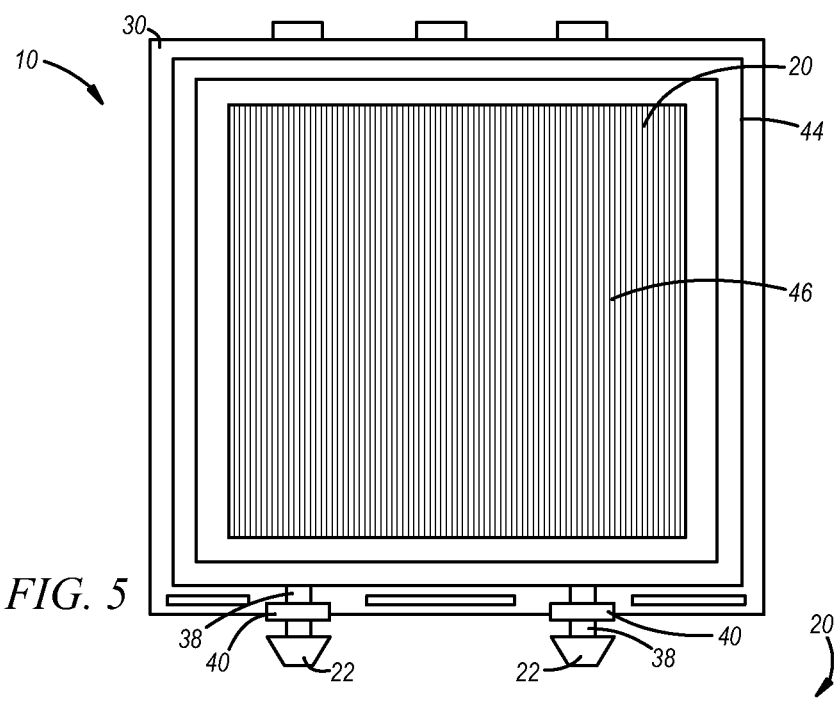
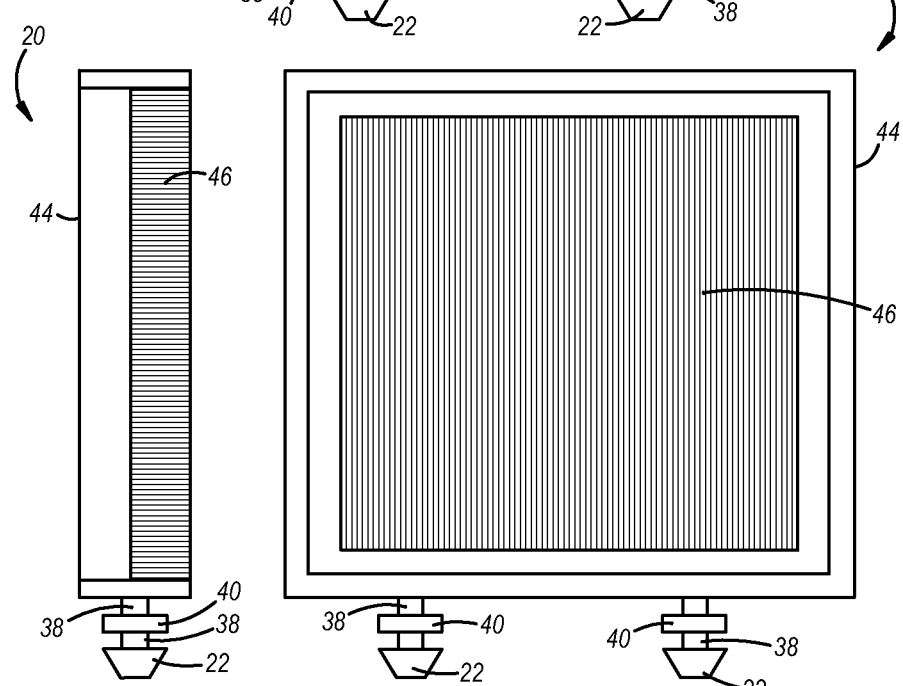

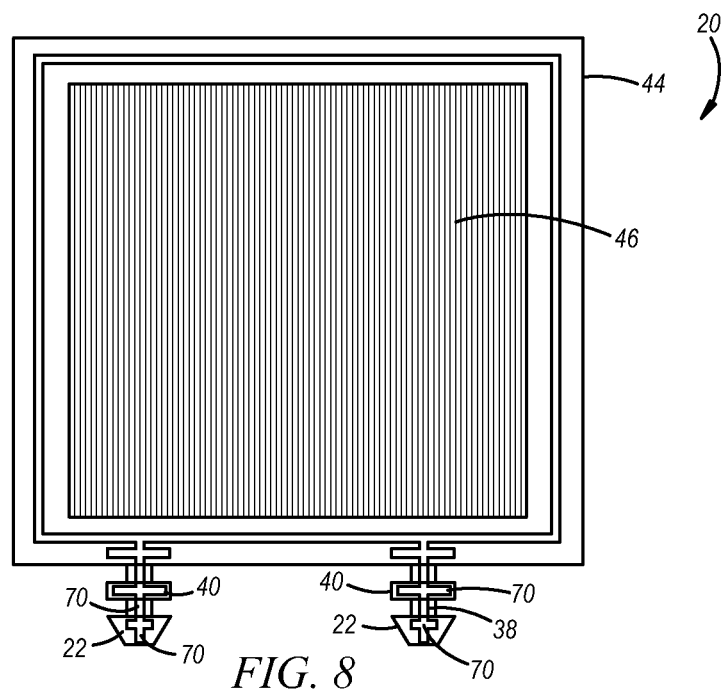
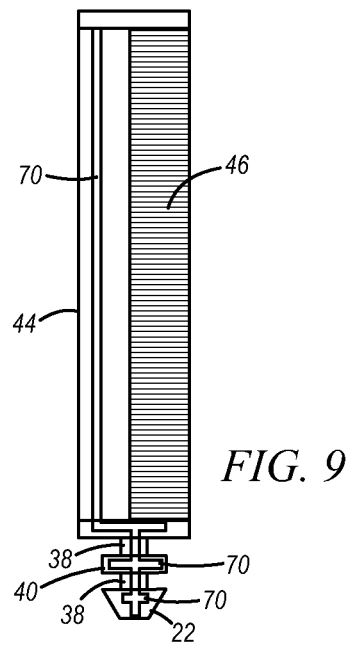

AUTOMOTIVE AIR CLEANER ELEMENTS WITH ATTACHMENT/INSULATION FEATURE

TECHNICAL FIELD

The field to which the disclosure generally relates to includes air cleaning elements, and more specifically air cleaning elements for use within automotive applications.

BACKGROUND

Air cleaning elements have been used in a variety of vehicles.

SUMMARY OF ILLUSTRATIVE VARIATIONS

A number of variations may include an air cleaner assembly, which may include a first housing portion having at least one air inlet aperture. The air cleaner assembly may also include a second housing portion operably coupled to the first housing portion and having at least one air outlet aperture. The air cleaner assembly may also include a filter media which may be disposed between the first housing portion and the second housing portion. At least one insulator is integral with the filter media.

A number of variations may include an air cleaner assembly having a first housing portion and a second housing portion. A replaceable filter media may be disposed between the first housing portion and the second housing portion. Moreover, at least one insulator may be integrally formed with the filter media.

A number of variations may include a method comprising providing a first housing portion having at least one air inlet aperture, a second housing portion operably coupled to the first housing portion and having at least one air outlet aperture. A filter media may be disposed between the first housing portion and the second housing portion. At least one insulator may be integral with the filter media. Next, air may be received through at least one inlet aperture. Filtered air may be produced through the at least one air outlet aperture. The filter media may then be removed including the at least one insulator. A second filter media may be placed between the first housing portion and the second housing portion and the second filter media includes at least one integral insulator.

Other illustrative variations within the scope of the invention will become apparent from the detailed description provided hereinafter. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein:

FIG. 1 is a front perspective view of a prior art air cleaner assembly;

FIG. 2 is an exploded view of the prior art air cleaner assembly illustrated in FIG. 1;

FIG. 5 is a top plan view of the air cleaner element according to a number of variations;

FIG. 6 is a top plan view of a filter media according to a number of variations;

FIG. 7 is a side view of the filter media according to a number of variations;

FIG. 8 is a top plan view of the filter media according to a number of variations; and FIG. 9 is a side view of the filter media illustrated in FIG. 8.

DETAILED DESCRIPTION OF ILLUSTRATIVE VARIATIONS

Figure 3:
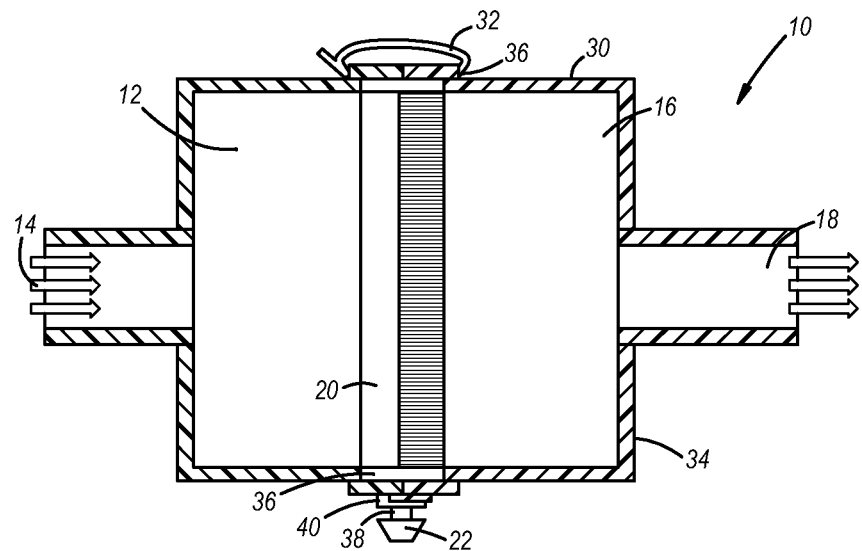
FIG. 3 is a side plan view of an interior of the air cleaner element according to a number of variations.

The following description of the variations is merely illustrative in nature and is in no way intended to limit the scope of the invention, its application, or uses.

As illustrated in FIGS. 3-9, reference numeral 10 generally relates to an air cleaner assembly which may include a first housing portion 12 and may include at least one air inlet aperture 14. The air cleaner assembly 10 may also include a second housing portion 16 which may also have at least one air outlet aperture 18. The air cleaner assembly 10 may further include a filter media 20 disposed between the first housing portion 12 and the second housing portion 16. At least one insulator 22 may be integrally formed with the filter media 20.

As shown in FIGS. 1 and 2, a prior art air cleaner mechanism 200 includes an upper housing 202 and a lower housing 204 each having air inlet/outlet apertures 206, 208. A filter 210 is disposed between the upper and lower housing portions 202, 204. Additionally, standard insulators 212 are attached or operably coupled to the lower housing portion 204. Further, when replacing the filter 210 after use, the standard insulators 212 remain engaged with the lower portion of the housing 202.

In a number of variations, for example, as illustrated in FIG. 3, the first and second housing 12, 16 may form a single housing 30 which may have a generally rectangular structure, when operably coupled together. The first housing 12 and the second housing 16 may be operably coupled by an air box clip 32, as shown in FIG. 3, or by any other affixing means as known by one of ordinary skill in the art including, but not limited, to gluing or other adhesive, nuts and bolts, magnetic adhesive, etc. The first and second housing 12, 16 may be comprised of steel, stainless steel, metal, aluminum, plastic composite material, or other material as known by one of ordinary skill in the art. The first and second housings 12, 16 may be hollow, or may include additional filtering materials in order to further clean the air which flows through the air cleaner assembly 10.

The first and second housings 12, 16 may also each include at least one aperture. Each aperture may be an inlet aperture 14, an outlet aperture 18, or both an inlet and outlet aperture 14, 18. As shown in the variation illustrated in FIG. 3, the apertures 14, 18 may be generally cylindrical protrusions. It is also contemplated that the inlet and outlet apertures 14, 18 are of any other shape as known to one of ordinary skill in the art in order to facilitate proper air flow and distribution throughout the air cleaner assembly 10.

In the variations illustrated in FIG. 3, the inlet and outlet apertures 14, 18 may be disposed centrally along a perimeter 34 of the housing 30. The inlet aperture 14 and the outlet aperture 18 may be disposed directly across from one another. It is also contemplated that the inlet aperture 14 and outlet aperture 18 may be arranged in any other manner which would promote air flow through the filter media 20.

The filter media 20 may be disposed between the first housing 12 and the second housing 16. The filter media 20 may be disposed equally distant from the inlet aperture 14 and outlet aperture 18. It is also contemplated that the filter media 20 may be disposed closer to the inlet aperture 14 or closer to the outlet aperture 16, as the first and second housing 12, 16 may be identical in size as shown in FIG. 3 or the first housing 12 may be larger than the second housing 16 or vice versa. The size and position of the filter media 20, which corresponds with the size and position of the first and second housings 12, 16, may be determined by one of ordinary skill in the art in order to optimize air flow. Additionally, as shown in the variations illustrated in FIG. 3, the insulator 22, which may be integrally formed with the filter media, may be disposed outside of the first and second housing 12, 16. One of the first and second housing 12, 16 may include a cutout 36 or other feature which is configured to allow the insulator 22 of the filter media 20 to extend outside of the first and second housing 12, 16.

Figure 4:
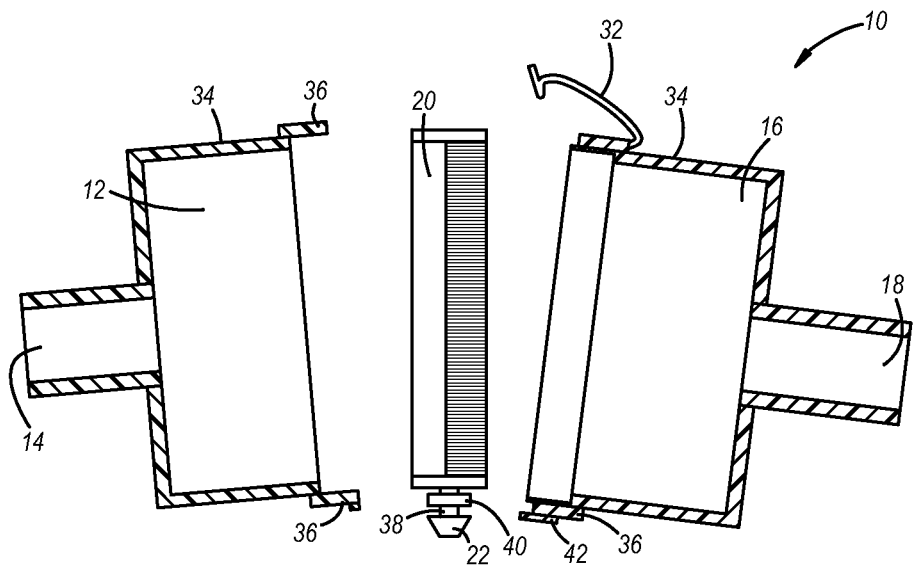
FIG. 4 is a exploded side plan view of the interior of the air cleaner element according to a number of variations.

Referring now to the variations illustrated in FIG. 4, as described above, the first housing 12 and the second housing 16 may be configured to separate from one another, which, in turn, releases the filter media 20. As illustrated in the variations depicted in FIG. 4, the filter media 20 may include at least one integral protrusion 38 which extends outward from the filter media 20 and includes the insulator 22 on a distal end. A cross section of the insulator 22, as shown in the variations illustrated in FIG. 4, may be generally trapezoidal. It is also contemplated that the insulator 22 may be of any other shape as known to one of ordinary skill in the art.

Also disposed on the parallel protrusion 38, may be a cylindrical protrusion 40 which is configured to provide engagement with the perimeter of the first and second housings 12, 16. The cylindrical protrusion 40 may be of any shape or size in order to engage both the first housing portion 12 and the second housing portion 16.

As also illustrated in the variations shown in FIG. 4, the first and second housings 12, 16 may include latches 42 or other mechanisms which are configured to secure the filter media 20 between the first and second housings 12, 16. The latches 42 or mechanisms may be of any type or size as known by one of ordinary skill in the art.

Referring now to the variations illustrated in FIG. 5, the filter media 20 may be generally rectangular and extend an entire width and length of the single housing 30. The filter media 20 may also include a perimeter 44 comprised of sealing foam, or other foam material as known by one of ordinary skill in the art. The sealing foam 44 may completely surround a filter portion 46 of the filter media 20 and may be in a butting contact along the perimeter 34 of the single housing 30. The filter media 20 may include more than one insulator 22. The filter media may include two insulators 22. It is also contemplated that more or less than two insulators 22 may be present on the filter media 20. The insulators 22 may be disposed symmetrically on the perimeter 34 of the first and second housings 12, 16, or may be disposed in any arrangement known by one of ordinary skill in the art in order to provide insulation for vibrations. The insulators 22 may be comprised of a rubber or metal material similar to the material used for the first and second housings 12, 16, or the insulators 22 may be comprised of a sealing foam similar to the perimeter 44 of the filter media 20. It is also contemplated that the insulators 22 may be comprised of any other material as known by one of ordinary skill in the art which provides insulation for vehicle vibrations. Additionally, the insulators 22 may provide attachment points for the air cleaner assembly to attach to other mechanical features of the vehicle.

The filter portion 46 of the filter media 20 may be comprised of a standard filter paper. It is also contemplated that the filter media 20 may be comprised of any other material as known by one of ordinary skill in the art which filters air. The filter media 20 may be of any thickness as known by one of ordinary skill in the art in order to provide filtered air to the air cleaning assembly 10.

As also illustrated in FIG. 6, the insulators 22 may be integral with and embedded into the filter media 20. The filter media 20 and the insulators 22 may form a single replaceable filtering means which may be removed and replaced by a second single filtering having integral and embedded insulators 22 at any time as desired by a user.

In operation, the automotive air cleaner assembly 10 may be constructed using a first housing portion 12 and the second housing portion 16 and having the filter media 20 with the insulators 22 embedded into the filter media 20 and disposed between the first and second portions of the housing 12, 16. Air may flow in through the inlet aperture 14 of the first housing portion 12, through the filter media 20, and purified air flows out the outlet aperture 18 in the second housing portion 16. When desired by user, the first and second housing portion 12, 16 may be separated and the filter media 20 including the insulators 22 can be removed. A second filter media 20, also including the integral insulators 22, may then be placed in between the first and second housing portions 12, 16 and the first and second housing portions 12, 16 are again attached to form the automotive air cleaner assembly 10.

Referring now to the variations shown in FIGS. 8 and 9, the variations shown in FIGS. 8 and 9 may include many of the features as described above including the first and second housing portions 12, 16, and the filter media 20 having at least one integral insulator 22. It is also contemplated, as shown in FIGS. 8 and 9, that the filter media 20 may include a filter skeleton 70 disposed on a perimeter of the filter media 20. The filter skeleton 70 may be comprised of a metal or steel alloy or any other material as known by one of ordinary skill in the art in order to provide additional rigidly and structural support to the filter media 20. Moreover, it is contemplated that the filter skeleton 70 may extend into the insulators 22, thereby providing additional rigidly and support to the insulators 22.

The following description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

Variation 1 may include an air cleaner assembly comprising a first housing portion having at least one air inlet aperture, a second housing portion operably coupled to the first housing portion and having at least one air outlet aperture, and a filter media disposed between the first housing portion and the second housing portion wherein at least one insulator is integral with the filter media.

Variation 2 may include the air cleaner assembly as set forth in variation 1 wherein the filter media is a removable and replaceable filter media.

Variation 3 may include the air cleaner assembly as set forth in any of the variations 1-2 further including wherein the first housing portion and the second housing portion are operably coupled using an air box clip or other fastening means.

Variation 4 may include the air cleaner assembly as set forth in any of variations 1-3, wherein the air cleaner assembly is constructed and arranged to insulate vibrations.

Variation 5 may include the air cleaner assembly as set forth in variations 1-4, wherein the at least one insulator provides an attachment point for the air cleaner assembly to be attached to a vehicle body.

Variation 6 may include the air cleaner assembly as set forth in any of variations 1-5, further comprising a filter skeleton disposed on a perimeter of the filter media.

Variation 7 may include the air cleaner assembly as set forth in any of variations 1-6, wherein the filter media further includes a ceiling form portion constructed and arranged to produce an air tight fit with the first and second housing portions.

Variation 8 may include the air cleaner assembly which comprises a first housing portion and a second housing portion wherein each of the first and second housing portions include an aperture, and a replaceable filter media disposed between the first housing portion and the second housing portion wherein at least one insulator is integrally formed with the filter media.

Variation 9 may include the air cleaner assembly as set forth in variation 8, wherein the first housing portion includes an air inlet aperture and the second housing portion includes an air outlet aperture.

Variation 10 may include the air cleaner assembly as set forth in any of variations 8 and 9, wherein the filter media and the at least one insulator are removable and replaceable.

Variation 11 may include the air cleaner assembly as set forth in any of variations 8-10, wherein the first housing portion and the second housing portion are operably coupled using an air box clip or other fastening means.

Variation 12 may include the air cleaner assembly as set forth in any of the variations 8-11, wherein the air cleaner assembly is constructed and arranged to insulate vibrations.

Variation 13 may include the air cleaner assembly as set forth in any of the variations 8-12, wherein the at least one insulator provides an attachment point for the air cleaner assembly to be attached to a vehicle body.

Variation 14 may include the air cleaner assembly as set forth in any of variations 8-13, further including a filter skeleton disposed on the perimeter of the filter media.

Variation 15 may include a method including providing a first housing portion having at least one air inlet aperture, a second housing portion operably coupled to the first housing portion and having at least one air outlet aperture and a filter media disposed between the first housing portion and the second housing portion wherein at least one insulator is integral with the filter media, receiving air through the at least one air inlet aperture, producing filtered air through the at least one air outlet aperture, removing the filter media including at least one insulator, and placing a second filter media between the first housing portion and the second housing portion wherein the second filter media includes at least one integral insulator.

Variation 16 may include the method as set forth in variation 15 wherein the first housing portion and the second housing portion are operably coupled using an air box clip or other fastening means.

Variation 17 may include the method as set forth in any of variations 15 or 16, wherein the air cleaner assembly is constructed and arranged to insulate vibrations.

Variation 18 may include the method as set forth in any of variations 15-17, wherein the at least one insulator provides an attachment point for the air cleaner assembly to be attached to the vehicle body.

Variation 19 may include the method as set forth in any of variations 15-18, wherein a filter skeleton is disposed on a perimeter of the filter media.

Variation 20 may include the method as set forth in any of variations 15-19, wherein the filter media further includes a ceiling form portion constructed and arranged to produce an air tight fit with the first and second housing portions.

The above description the select variations within the scope of the invention is merely illustrative in nature and, thus, variations or variants thereof are not to be regarded as a departure from the spirit and scope of the invention.

What is claimed is:

1. An air cleaner assembly, comprising:
   a first housing portion having at least one air inlet aperture;
   a second housing portion operably coupled to the first housing portion and having at least one air outlet aperture;
   a filter media disposed between the first housing portion and the second housing portion and wherein at least one insulator is integral with the filter media and wherein at least one insulator is disposed outside of the first and second housing portions.

2. The air cleaner assembly of claim 1, wherein the filter media is a removable and replaceable filter media.

3. The air cleaner assembly of claim 1, wherein the first housing portion and the second housing portion are operably coupled using an air box clip or other fastening means.

4. The air cleaner assembly of claim 1, wherein the air cleaner assembly is constructed and arranged to insulate vibrations.

5. The air cleaner assembly of claim 1, wherein the at least one insulator provides an attachment point for the air cleaner assembly to be attached to a vehicle body.

6. The air cleaner assembly of claim 1, further comprising a filter skeleton disposed on a perimeter of the filter media.

7. The air cleaner assembly of claim 1, wherein the filter media further includes a sealing form portion constructed and arranged to produce an airtight fit with the first and second housing portions.

8. An air cleaner assembly, comprising:
   a first housing portion and a second housing portion, wherein each of the first and second housing portions include an aperture; and
   a replaceable filter media disposed between the first housing portion and the second housing portion wherein at least one insulator is integrally formed with the filter media and wherein at least one insulator is disposed outside of the first and second housing portions.

9. The air cleaner assembly of claim 1, wherein the first housing portion includes an air inlet aperture and the second housing portion includes an air outlet aperture.

10. The air cleaner assembly of claim 8, wherein the filter media and the at least one insulator are removable and replaceable.

11. The air cleaner assembly of claim 8, wherein the first housing portion and the second housing portion are operably coupled using an air box clip or other fastening means.

12. The air cleaner assembly of claim 8, wherein the air cleaner assembly is constructed and arranged to insulate vibrations.

13. The air cleaner assembly of claim 8, wherein the at least one insulator provides an attachment point for the air cleaner assembly to be attached to a vehicle body.

14. The air cleaner assembly of claim 8, further comprising a filter skeleton disposed on a perimeter of the filter media.

15. A method comprising:
   providing a first housing portion having at least one air inlet aperture, a second housing portion operably coupled to the first housing portion and having at least one air outlet aperture, and a filter media disposed between the first housing portion and the second housing portion and wherein at least one insulator is integral with the filter media and wherein at least one insulator is disposed outside of the first and second housing portions;

receiving air through the at least one air inlet aperture;

producing filtered air through the at least one air outlet aperture;

removing the filter media including the at least one insulator; and placing a second filter media between the first housing portion and the second housing portion wherein the second filter media includes at least one integral insulator.

16. The method of claim 15, wherein the first housing portion and the second housing portion are operably coupled using an air box clip or other fastening means.

17. The method of claim 15, wherein the air cleaner assembly is constructed and arranged to insulate vibrations.

18. The method of claim 15, wherein the at least one insulator provides an attachment point for the air cleaner assembly to be attached to a vehicle body.

19. The method of claim 15, wherein a filter skeleton is disposed on a perimeter of the filter media.

20. The method of claim 15, wherein the filter media further includes a sealing form portion constructed and arranged to produce an airtight fit with the first and second housing portions.

21. The air cleaner assembly of claim 1, wherein the filter media includes a perimeter comprised of sealed foam.

22. The air cleaner assembly of claim 1, wherein the filter media includes at least two insulators.

23. The air cleaner assembly of claim 1, wherein the insulator comprises at least one of rubber or a metal material.

24. The air cleaner assembly of claim 1, wherein at least one insulators is embedded into the filter media.

25. The air cleaner assembly of claim 8, wherein at least one insulator is embedded into the filter media.

26. The method of claim 15, wherein at least one insulators is embedded into the filter media.

27. The air cleaner assembly of claim 6, wherein the filter skeleton extends into at least one insulator.

28. The air cleaner assembly of claim 1, wherein the insulator comprises a sealing foam or metal.

29. The air cleaner assembly of claim 1, wherein the filter media is disposed equally distant from the air inlet aperture and air outlet aperture.

30. The air cleaner assembly of claim 6, wherein the filter skeleton is comprised of a metal alloy.

31. The air cleaner assembly of claim 6, wherein the filter skeleton is comprised of a steel alloy.

32. The air cleaner assembly of claim 1, wherein at least one insulator is disposed between the first and second portions of the housing.

* * * * *